(12) United States Patent
Kang et al.

(10) Patent No.: US 12,261,681 B2
(45) Date of Patent: Mar. 25, 2025

(54) NETWORK ACCESS METHOD AND APPARATUS FOR TERMINAL, ELECTRONIC DEVICE AND STORAGE MEDIUM

(71) Applicant: DATANG MOBILE COMMUNICATIONS EQUIPMENT CO., LTD., Beijing (CN)

(72) Inventors: Shaoli Kang, Beijing (CN); Deshan Miao, Beijing (CN); Bo Han, Beijing (CN); Shaohui Sun, Beijing (CN); Yingmin Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 39 days.

(21) Appl. No.: 17/766,737

(22) PCT Filed: Aug. 27, 2020

(86) PCT No.: PCT/CN2020/111568
§ 371 (c)(1),
(2) Date: Apr. 6, 2022

(87) PCT Pub. No.: WO2021/068675
PCT Pub. Date: Apr. 15, 2021

(65) Prior Publication Data
US 2024/0106527 A1    Mar. 28, 2024

(30) Foreign Application Priority Data
Oct. 11, 2019    (CN) .......................... 201910964696.2

(51) Int. Cl.
*H04B 7/185* (2006.01)

(52) U.S. Cl.
CPC ..... *H04B 7/18519* (2013.01); *H04B 7/18513* (2013.01)

(58) Field of Classification Search
CPC ..................... H04B 7/18513; H04B 7/18519
See application file for complete search history.

(56) References Cited

U.S. PATENT DOCUMENTS

| | | |
|---|---|---|
| 2014/0146691 A1 | 5/2014 | Soliman |
| 2015/0334678 A1 | 11/2015 | Macgougan et al. |
| (Continued) | | |

FOREIGN PATENT DOCUMENTS

| | | |
|---|---|---|
| CN | 1303182 A | 7/2001 |
| CN | 101080846 A | 11/2007 |
| (Continued) | | |

OTHER PUBLICATIONS

European Patent Office, Extended European Search Report Issued in Application No. 20874679.2, Oct. 6, 2023, Germany, 9 pages.

(Continued)

*Primary Examiner* — Wayne H Cai
(74) *Attorney, Agent, or Firm* — Kilpatrick Townsend & Stockton LLP

(57) ABSTRACT

Disclosed in the embodiments of the present application are a network access method and apparatus for a terminal, an electronic device and a storage medium. The method includes a terminal determining a beam sweeping interval and a sweeping frequency point, and receiving a base station signal sent or forwarded by a satellite; determining the downlink signal quality of the base station according to the base station signal; and if it is determined, according to the downlink signal quality, that the terminal can successfully find a satellite, executing a network access process of the terminal. In the embodiments of the present application, the downlink signal quality of a base station is determined by (Continued)

means of a base station signal sent or forwarded by a satellite; and it is further determined, according to the downlink signal quality, whether a terminal can successfully find a satellite.

18 Claims, 2 Drawing Sheets

(56) References Cited

U.S. PATENT DOCUMENTS

| | | | |
|---|---|---|---|
| 2017/0331670 | A1 | 11/2017 | Parkvall et al. |
| 2019/0150133 | A1 | 5/2019 | Li et al. |
| 2019/0159042 | A1 | 5/2019 | Tomeba et al. |
| 2019/0312619 | A1 | 10/2019 | Abedini et al. |
| 2022/0007403 | A1* | 1/2022 | Li .................... H04W 72/23 |
| 2022/0069902 | A1* | 3/2022 | Fan .................. H04W 36/322 |

FOREIGN PATENT DOCUMENTS

| | | |
|---|---|---|
| CN | 103064094 A | 4/2013 |
| CN | 105578587 A | 5/2016 |
| CN | 106941384 A | 7/2017 |
| CN | 107667486 A | 2/2018 |
| CN | 110099420 A | 8/2019 |
| JP | 2004023391 A | 1/2004 |
| JP | 2005295094 A | 10/2005 |
| JP | 2008502226 A | 1/2008 |
| TW | 200801567 A | 1/2008 |

OTHER PUBLICATIONS

ETRI, "Considerations on satellite location sharing", 3GPP TSG-RAN WG2 Meeting#107bis, Chongqing, China, Oct. 14-18, 2019, total 4 pages, R2-1913917(Revision of R2-1911424).

Qualcomm Incorporated, "On NTN Initial Search and Handover", 3GPP TSG RAN WG1 #97, Reno, USA, May 13-17, 2019, total 3 pages, R1-1907280.

Ericsson, "Ephemeris data", 3GPP TSG-RAN WG2 #107bis, Chongqing, China, Oct. 14-18, 2019, total 4 pages, R2-1912597.

Chen Kunshan, "Research on Uplink Access Technologies in GEO Satellite Communication System for LTE", A Dissertation Submitted to PLA Information Engineering University for the Degree of Master of Engineering, total 77 pages, Jun. 2013.

* cited by examiner

NETWORK ACCESS METHOD AND APPARATUS FOR TERMINAL, ELECTRONIC DEVICE AND STORAGE MEDIUM

CROSS-REFERENCE TO RELATED APPLICATIONS

The present application is a National Stage of International Application No. PCT/CN2020/111568, filed on Aug. 27, 2020, which claims priority to Chinese application No. 201910964696.2 filed on Oct. 11, 2019, entitled "Network Access Method and Apparatus for Terminal, Electronic Device and Storage Medium", which are hereby incorporated by reference in their entireties.

FIELD

The present application relates to the field of communication, and in particular, to a method and apparatus of accessing a network for a terminal, an electronic device and a storage medium.

BACKGROUND

For a satellite mobile communication system designed based on the terrestrial 5G (5th Generation, fifth generation mobile communication technology) standard, both a terminal and a network in the related art know ephemeris information and geographic location information, and the terminal can quickly and accurately access the network. For the terminal, there are various ways for notifying the ephemeris information, such as pre-setting before delivery, issuing a system message, and so on. There are also various ways for obtaining geographical positions of the terminal, such as GPS or Beidou positioning or network positioning, etc. Usually, the geographical position can be issued through a system message.

For a satellite communication system designed based on ephemeris information, in case that the ephemeris information obtained by the terminal and/or the network is inaccurate, a challenge will be posed to the accuracy of the system design. For example, taking a low earth orbit (LEO) satellite communication system as an example, according to the preliminary analysis, the system design has the following constraints: for the scenario of searching for satellite and accessing a network, in order to ensure the terminal performing a network access process within a beam, the ephemeris angle deviation needs to be within ±2 degrees; and for a program tracking scenarios using ephemeris, in order to provide ¼ half-power beamwidth range tracking, the ephemeris angle deviation needs to be within ±0.1 degrees.

However, for a terminal with preset ephemeris information, if the terminal is turned off for a long time and then turned on again, there is a deviation between corresponding current ephemeris information and the preset ephemeris information, so it is difficult to perform a satellite search based on its preset ephemeris information, which in turn leads to the problem of difficultly accessing to the network.

SUMMARY

Due to the above-mentioned problems in the traditional methods, an embodiment of the present application provides a method and apparatus of accessing a network for a terminal, an electronic device, and a storage medium.

According to a first aspect of the present application, a method for accessing a network is provided, which is performed by a terminal and includes:
  determining, by the terminal, a beam sweeping interval and a sweeping frequency, and receiving a base station signal transmitted or forwarded by a satellite;
  determining a quality of a downlink signal of the base station according to the base station signal;
  performing, by the terminal, a network access process in case that it is determined that the terminal is able to perform a satellite search successfully according to the quality of the downlink signal of the base station;
  the terminal set at least one beam sweeping interval within a range covered by a communication sweeping angle, and at least one sweeping frequency is set for each beam sweeping interval.

According to a second aspect of the present application, an apparatus of accessing a network access apparatus for a terminal is provided, which includes:
  a signal receiver configured to determine a beam sweeping interval and a sweeping frequency, and receive a base station signal transmitted or forwarded by a satellite;
  a quality determiner configured to determine a quality of a downlink signal of the base station according to the base station signal; and
  a network accessor configured to perform a network access process of the terminal in case that it is determined that the terminal is able to perform a satellite search successfully according to the quality of the downlink signal of the base station;
  the terminal set at least one beam sweeping interval within a range covered by a communication sweeping angle, and at least one sweeping frequency is set for each beam sweeping interval.

According to a third aspect of the present application a terminal is further provided, which includes:
  at least one processor; and
  at least one memory communicatively connected to the processor,
  the memory stores program instructions executable by the processor, the processor invokes the program instructions to perform the method above.

According to a fourth aspect of the present application, a non-transitory computer readable storage medium having stored thereon computer programs is further provided, the computer programs cause the computer to perform the method mentioned above:

In the embodiments of the present application, a quality of a downlink signal of the base station can be determined according to the base station signal transmitted or forwarded by the satellite, then that whether the terminal is able to perform a satellite search successfully can be determined according to the quality of a downlink signal, and the terminal can be accurately and fast search for the satellite for successful access and communication without ephemeris information, which is convenient for users to set the usage status of the terminal and prolong the service cycle of the terminal.

BRIEF DESCRIPTION OF THE DRAWINGS

In order to more clearly illustrate the embodiments of the present application, the drawings used in the descriptions of the embodiments will be briefly described below. The drawings in the following description are only some embodiments of the present application, and other drawings can be obtained.

DETAILED DESCRIPTION

The illustrative embodiments of the present application are further described in detail below with reference to the drawings. The following embodiments are only used to more clearly illustrate the embodiments of the present application, and cannot be used to limit the protection scope of the present application.

Figure 1:
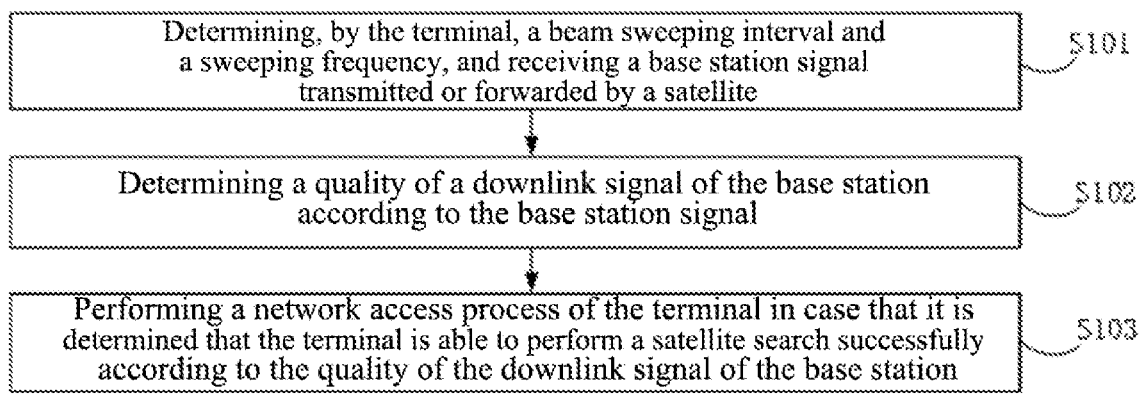
FIG. 1 is a schematic flowchart of a network access method for a terminal according to an embodiment of the present application.

FIG. 1 shows a schematic flowchart of a network access method for a terminal according to an embodiment of the present application; the method includes:

S101, determining, by the terminal, a beam sweeping interval and a sweeping frequency, and receiving a base station signal transmitted or forwarded by a satellite.

the terminal set at least one beam sweeping interval within the range covered by a communication sweeping angle, and at least one sweeping frequency is set for each beam sweeping interval.

The communication elevation and the azimuth angle may be comprehensively considered in communication sweeping angle, or only the communication elevation may be considered, and the sweeping interval is the range of the sweeping angle.

The sweeping frequencies cover all the working frequencies of a user link, and the sweeping order of each frequency is the same as the arrangement order of the satellite beams in the system.

In one embodiment, the sweeping order of the terminal is frequency first and then interval, that is, the sweeping of all sweeping frequencies in a beam sweeping interval is completed first, and then the beam sweeping interval is changed.

Taking the low-orbit satellite communication system based on the terrestrial 5G system as an example, it is assumed that the system user link has K working frequencies, and the working range of a system-defined terminal communication elevation is $\pm\theta$ (degrees), the sweeping information of the terminal needs to be determined firstly.

In one embodiment, the terminal divides a working range of its communication elevation into L intervals. Assuming that each interval is equally spaced, the terminal's sweeping range for a single frequency can be defined as the following 2L sweeping intervals:

sweeping interval n ($1 \leq n \leq L$): $[-\theta+(n-1)*2\theta/L, -\theta+n*2\theta/L]$;

sweeping interval m($L+1 \leq m \leq 2L$): $[\theta-(m-L-1)*2\theta/L, \theta-(m-L)*2\theta/L]$.

Considering that the system supports K working frequencies, that is, each beam sweeping interval corresponds to sweeping of K different sweeping frequencies, therefore, the terminal has a total sweeping interval of 2KL. It is assumed that the number of the sweeping interval is labeled as:

sweeping interval nK+k ($0 \leq n < L$, $1 \leq k \leq K$): $[-\theta+2n\theta/L, -\theta+(n+1)*2\theta/L]$;

sweeping interval mK+k ($L \leq m \leq 2L$, $1 \leq k \leq K$): $[\theta-(m-L)*2\theta/L, \theta-(m-L+1)*2\theta/L]$.

The terminal will perform frequency sweeping in each beam sweeping interval according to the above order, and receive the base station signal transmitted or forwarded by the satellite at each sweeping frequency in each beam sweeping interval.

S102, determining a quality of a downlink signal of the base station according to the base station signal.

For each sweeping frequency in each beam sweeping interval, the terminal receives the downlink signal of the base station, that is, the base station signal, and the base station signal at least includes synchronous signal block (SSB) and common reference signal (CRS). The SSB or CRS signal can be selectively obtained according to the set period.

In case that the base station is integrated with the satellite, the terminal receives the base station signal transmitted by the satellite; in case that the base station and the satellite are separated, the terminal receives the base station signal forwarded by the satellite.

At each sweeping frequency in each beam sweeping interval, after the base station signal transmitted or forwarded by the satellite is received, the quality of the downlink signal of the base station is determined according to a signal measurement value of the base station signal or other methods. For example, in case that the signal measurement value exceeds a preset strength, it means that the quality of a downlink signal is very good, otherwise it means that the quality of a downlink signal is bad.

S103, performing, by the terminal, a network access process in case that it is determined that the terminal is able to perform a satellite search successfully according to the quality of the downlink signal of the base station.

The capability to search for a satellite of the terminal is obtained according to the quality of a downlink signal. In case that the downlink signal quality is bad, it means that the capability for searching for a satellite of the terminal is weak, searching for satellite is unsuccessful, and a network for the terminal cannot be accessed. It is necessary to receive a base station signal transmitted or forwarded by the satellite at a new sweeping frequency and determine the quality of the downlink signal, in case that the quality of the downlink signal is good, it means that the terminal has strong satellite searching capability, searching for satellite is successful, and a network for the terminal can be accessed.

In one embodiment, the terminal performs network access preparations according to whether the searching for a satellite is successful. In case that the searching for a satellite is unsuccessful, the terminal will replace the beam sweeping interval for sweeping, and then re-acquire the downlink signal (the base station signal transmitted or forwarded by the satellite) in the sweeping interval, obtain the quality of the downlink signal of the base station, obtain the capability for searching for a satellite of the terminal, and finally prepare for terminal access. In case that the searching for a satellite is successful, a network for the terminal is accessed.

In the embodiments of the present application, a quality of a downlink signal of the base station is determined according to the base station signal transmitted or forwarded by the satellite; it is determined that whether the terminal is able to perform a satellite search successfully according to the quality of a downlink signal; without depending on ephemeris information, and the terminal can be accurately and fast search for the satellite for successful access and communication, which is convenient for users to set the usage status of the terminal and prolong the service cycle of the terminal.

Further, on the basis of the foregoing method embodiments, in case that the base station signal is an SSB signal, the S102 includes:

in case that a signal measurement value of a primary synchronization signal (PSS) or secondary synchronization signal (SSS) in the SSB signal is greater than a first measurement preset value, determining that the quality of the downlink signal of the base station is up to a quality standard; or in case that a correct ID of a cell is detected according to the SSB signal, determining that the quality of the downlink signal of the base station is up to a quality standard.

The signal measurement value includes a reference signal receiving power (RSRP) of a synchronization signal or a reference signal receiving quality (RSRQ) of the synchronization signal.

The first measurement preset value is a threshold value of the signal measurement value of the PSS or SSS signal.

Being up to the quality standard means that the quality of the downlink signal of the base station meets a quality requirement.

For example, in case that the signal measurement value of PSS or SSS in the SSB signal is greater than the first measurement preset value, it is determined that the quality of the downlink signal of the base station is up to a quality standard; otherwise, the quality of the downlink signal of the base station is determined to be substandard quality.

In one embodiment, if the correct ID of a cell can be detected according to the SSB signal, the quality of the downlink signal of the base station is determined to be up to the quality standard; if the correct ID of a cell cannot be detected based on the SSB signal, the quality of the downlink signal of the base station is determined to be substandard quality.

In another embodiment, in case that the base station signal is a CRS signal, the determining the quality of the downlink signal of the base station according to the base station signal includes:

determining the quality of the downlink signal of the base station to be up to a quality standard in case that the signal measurement value of the CRS signal is greater than a second measurement preset value, or a signal-to-noise ratio (SNR) of a receiving end for the CRS signal is greater than a third measurement preset value; and the signal measurement value includes a RSRP of the synchronization signal or a Reference Signal Received Quality (RSRQ) of the synchronization signal.

The second measurement preset value is a threshold value of the signal measurement value of the CRS signal.

The third measurement preset value is a threshold value of the SNR of a receiving end for the CRS signal.

In the present embodiment, being up to a quality standard has the same meaning as that expressed in the previous embodiment, that is, it means that the quality of the downlink signal of the base station meets a quality requirement.

In one embodiment, the quality of a downlink signal is obtained according to the signal measurement value of the CRS. In case that the signal measurement value is greater than or equal to the second measurement preset value, it means that the quality of a downlink signal is good, that is, the quality is up to a quality standard; in case that the signal measurement value of the CRS is smaller than the second measurement preset value, it means that that the quality of a downlink signal is poor, that is, the quality is substandard quality.

In one embodiment, the quality of a downlink signal is obtained according to the SNR of the CRS. In case that the SNR is greater than or equal to the third measurement preset value, it means that the quality of a downlink signal is good; and in case that the SNR is smaller than the third measurement preset value, it means that the quality of a downlink signal is poor.

Further, on the basis of the embodiments mentioned above, the S103 includes:

determining that the terminal is able to perform the satellite search successfully in case that the quality of the downlink signal of the base station is up to the quality standard, and recording a current beam sweeping interval, a sweeping frequency and a satellite searching time; and calculating ephemeris information according to the beam sweeping interval, the sweeping frequency and the satellite searching time, and accessing a network for the terminal according to the ephemeris information.

For example, in case that the quality of the downlink signal of the base station is up to the quality standard, it is determined that the terminal is able to perform a satellite search successfully, and the sweeping interval, sweeping frequency and satellite searching time of the terminal are recorded; ephemeris information is calculated according to the beam sweeping interval, sweeping frequency and satellite searching time, a current satellite is determined and an ephemeris situation of an entire constellation is established and a normal access process is carried out. For simplicity, the access process can be performed with reference to the established ephemeris. For example, since the terminal knows its staying time in the corresponding beam and other information, if the staying time is long enough, the terminal starts to initiate access in this beam, and if the staying time is too short, the terminal waits to enter the next beam and then initiates access.

In an embodiment, on the basis of the above embodiments, the network access method of the terminal further includes:

in case that the quality of the downlink signal of the base station is not up to the quality standard, replacing with a new beam sweeping interval and sweeping frequency, and receiving the base station signal transmitted or forwarded by the satellite at a sweeping frequency in the new beam sweeping interval.

In one embodiment, the capability to search for a satellite of the terminal is obtained according to whether the quality of a downlink signal is up to the quality standard: in case that the quality of a downlink signal is not up to the quality standard, it means that the capability to search for a satellite of the terminal is weak, searching for satellite is unsuccessful, and a network for the terminal cannot be accessed and it is necessary to re-receive the base station signal transmitted or forwarded by the satellite at the new sweeping frequency for determination.

For example, in case that the quality of the downlink signal of the base station is not up to the quality standard, it is determined that the capability to search for a satellite of the terminal is weak and satellites cannot be successfully searched and new beam sweeping interval and sweeping frequency needs to be replaced and the signal transmitted by the base station is re-received at the sweeping frequency of the new beam sweeping interval, to finally access a network for the terminal after it is determined that the quality of the downlink signal of the base station is up to a quality standard.

Further, on the basis of the embodiments mentioned above, the S101 includes:

determining a sweeping angle range of the beam sweeping interval according to a movement direction of the satellite, and searching for satellite signals at one or more sweeping frequency of each beam sweeping interval within the sweeping angle range; or determining the target sweeping interval according to a preset sweeping angle, and searching for satellite signals at respective sweeping frequencies of the target sweeping interval, without performing angle sweeping;

respective sweeping frequencies are sorted according to the frequency multiplexing mode of the satellite, and the periodic polling is performed.

In order to maintain the validity of searching for the satellite, a satellite is searched in the three-dimensional space, but is swept in only the orbital plane where the movement trajectory of the satellite is located relative to the movement direction of the satellite; or it may search a satellite in the vertical direction of the terminal (sub-satellite point) and wait for the satellite signals, without performing angle sweeping.

For example, in case that the satellite is moving in the north-south direction, the terminal only needs to search in the sweeping range where the north-south direction is located, and does not need to conduct an omnidirectional satellite search on the spherical surface. In case that the satellite is moving in the east-west direction, the terminal only needs to search in the range of the sweeping interval in the east-west direction, and there is no need to conduct an omnidirectional satellite search on the spherical surface.

As in the previous example, although the working range of the communication elevation of the terminal defined by the system is ±θ (degrees), the terminal actually sets the sweeping interval using a range based on ±φ (degrees) in case that searching for the satellite where φ<θ and φ is related to the beam sweeping range of the satellite.

sweeping interval $nK+k$ ($0 \le n < L$, $1 \le k \le K$): $[-\phi+2n\phi/L, -\phi+(n+1)*2\phi/L]$;

sweeping interval $mK+k$ ($L \le m < 2L$, $1 \le k \le K$): $[\phi-(m-L)*2\phi/L, \phi-(m-L+1)*2\phi/L]$.

In one embodiment, the terminal is able to perform a satellite search only at a specific angle, for example, the terminal searches for satellites in the vertical direction (sub-satellite point) and waits for the arrival of satellite signals without angle sweeping. As in the previous example, similar to setting θ=0, there is only one fixed vertical receiving signal direction, and the working frequencies are changed in turn to receive downlink signals in this direction.

In the present embodiment, by determining a movement track and movement direction of the satellite, the satellite is searched in a specific sweeping range or a specific sweeping angle, and there is no need to search for satellite all-round on the spherical surface, and the satellite can be quickly searched, and quickly performing a network access process for communication.

Figure 2:
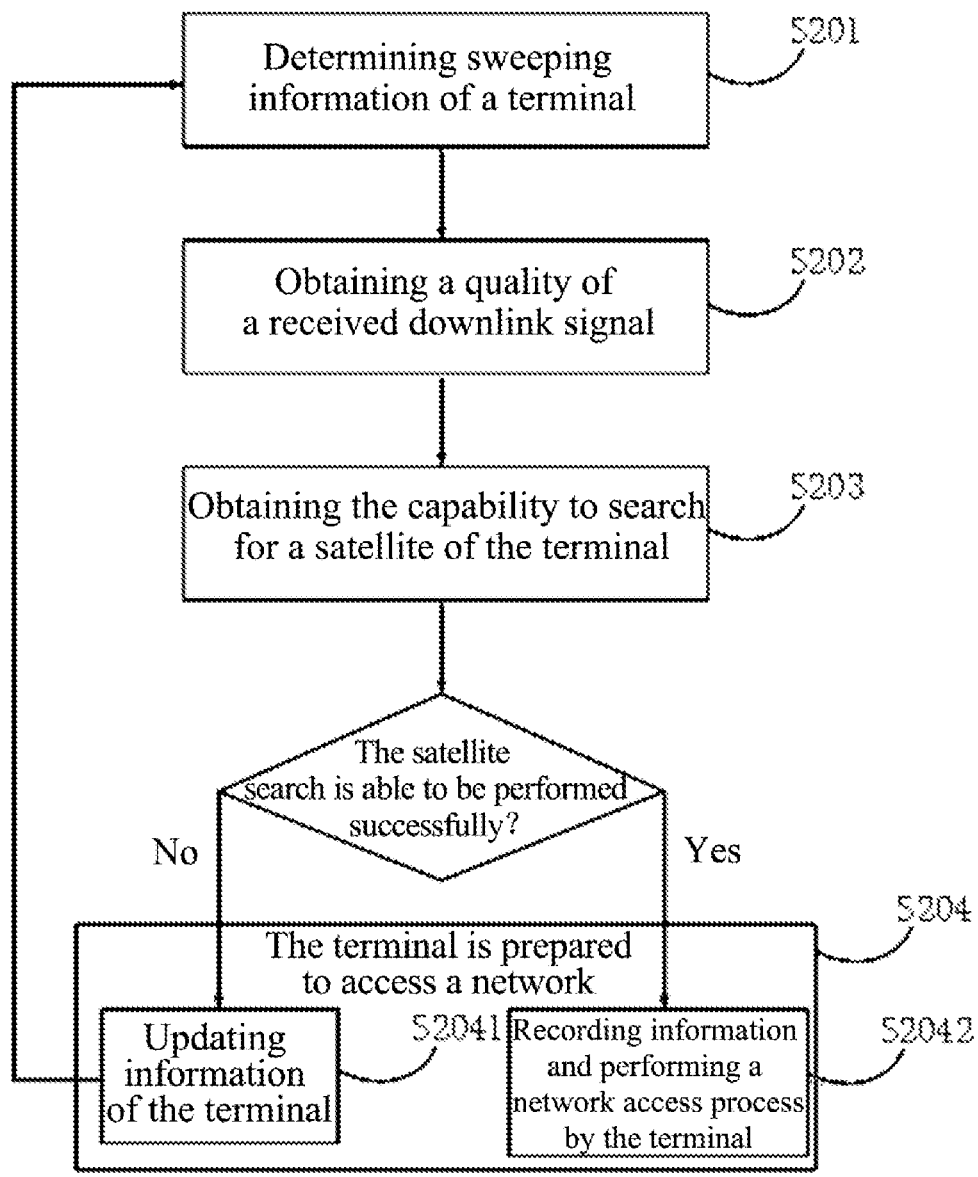
FIG. 2 is a schematic flowchart of a network access method for a terminal according to another embodiment of the present application.

For the satellite communication system designed based on the terrestrial 5G standard, the present embodiment can solve the problem of searching for satellites and performing a network access process in case that the ephemeris information is inaccurate or there is no ephemeris information. As shown in FIG. 2, the present embodiment includes the following steps:

S201, determining sweeping information of a terminal. The terminal sets sweeping intervals within the range covered by the sweeping angle, and sets sweeping frequencies in each sweeping interval, and sweeps one by one in order.

S202. obtaining a quality of a received downlink signal. For a frequency in a beam sweeping interval, downlink signal is received:

The downlink signal can be SSB or CRS, and the period can be configured;

in case that the downlink signal is SSB, signal of PSS or SSS is detected, or RSRP or Reference Signal Received Power (RSRQ) is measured using a synchronization signal;

in case that the downlink signal is CRS, the RSRP value, the RSRQ value or the SNR value are calculated.

S203. obtaining the capability to search for a satellite of the terminal. It is determined whether searching for the satellite is successful based on the downlink signal.

In case that the SSB signal is used for determining whether searching for the satellite is successful, if an ID of a cell is detected based on PSS, SSS and a physical broadcast channel (PBCH) or the signal measurement value RSRP or RSRQ is greater than the first measurement preset value, it means that the terminal is able to perform a satellite search successfully; otherwise, it means that the terminal can unsuccessfully search for the satellite;

In case that the CRS signal is used for determining whether searching for the satellite is successful, if RSRP or RSRQ is greater than the second measurement preset value or SNR is greater than the third measurement preset value, it means that the terminal is able to perform a satellite search successfully; if RSRP or RSRQ is less than the predetermined second measurement preset value or if the SNR is less than the third measurement preset value, it means that the terminal can unsuccessfully search for the satellite.

S204, preparing for allowing the terminal to access a network. S2041 or S2042 is selectively performed according to the result of step S203.

S2041, updating information of the terminal. In case that the terminal fails to search for satellites, the beam sweeping interval is replaced for sweeping, and the process goes to step S202.

S2042, by the terminal, recording information and performing a network access process. If the terminal is able to perform a satellite search successfully, a satellite searching time, a sweeping frequency, a terminal sweeping angle and other information are recorded, and the ephemeris information of the satellite and other satellites in the constellation is calculated, and the process for performing the network access process is started.

It should be noted that the terminal can access the network in this beam, or can start to access the network from the next adjacent beam.

The present embodiment does not depend on ephemeris information for accessing the terminal, which not only removes the cost of obtaining ephemeris, but also enables the user to conveniently set the usage state of the terminal and prolong the service cycle of the terminal.

Figure 3:
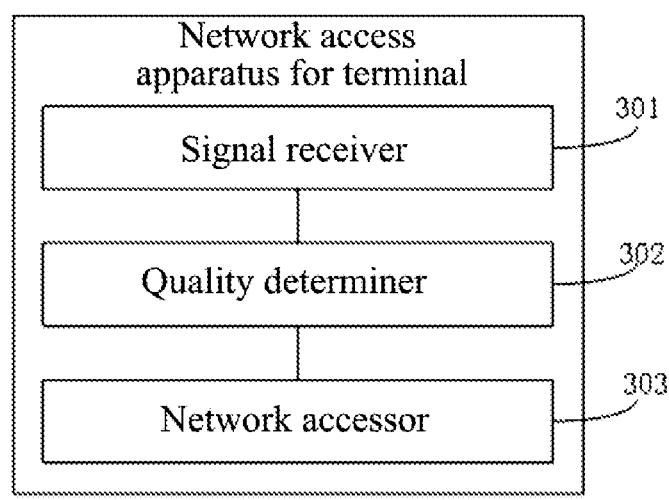
FIG. 3 is a schematic flowchart of a network access apparatus for a terminal according to an embodiment of the present application.

FIG. 3 shows a schematic structural diagram of a network access apparatus for a terminal according to an embodiment of the present application. The network access apparatus for a terminal includes a signal receiver 301, a quality determiner 302 and a network accessor 502 in which:

the signal receiver 301 configured to determine a beam sweeping interval and a sweeping frequency, and receive a base station signal transmitted or forwarded by a satellite;

the quality determiner 302 configured to determine a quality of a downlink signal of the base station according to the base station signal; and the network accessor 303 configured to perform a network access process of the terminal in case that it is determined that the terminal is able to perform a satellite search successfully according to the quality of the downlink signal of the base station;

the terminal set at least one beam sweeping interval within the range covered by a communication sweeping angle, and at least one sweeping frequency is set for each beam sweeping interval.

The network access apparatus for a terminal described in the present embodiment can be used to execute the corresponding method embodiments above, and the principles thereof are similar, and details are not described herein again.

Figure 4:
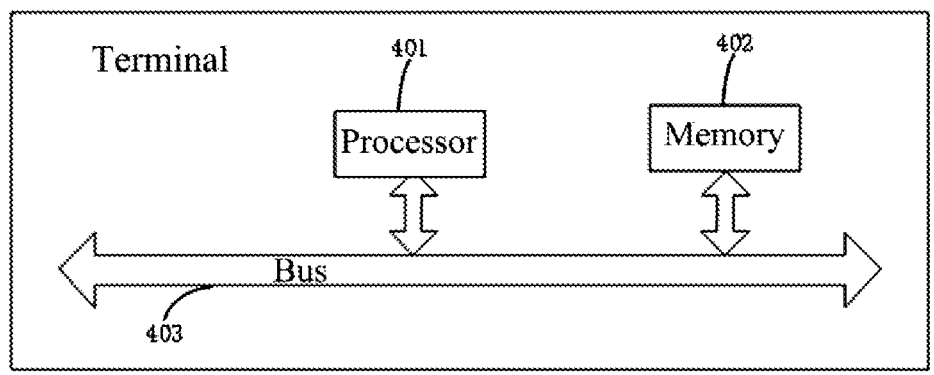
FIG. 4 is a logical block diagram of a terminal according to an embodiment of the present application.

Referring to FIG. 4, the terminal includes a processor 401, a memory 902, a communications interface 402 and a bus 403.

The processor 401 and the memory 402 communicate with each other through the bus 403.

The processor 401 is configured to invoke program instructions in the memory 402 to perform the following methods:

determining a beam sweeping interval and a sweeping frequency, and receiving a base station signal transmitted or forwarded by a satellite;

determining a quality of a downlink signal of the base station according to the base station signal;

performing the network access process in case that it is determined that the terminal is able to perform a satellite search successfully according to the quality of the downlink signal of the base station;

the terminal set at least one beam sweeping interval within the range covered by a communication sweeping angle, and at least one sweeping frequency is set for each beam sweeping interval.

In the embodiments of the present application, a quality of a downlink signal of the base station is determined according to the base station signal transmitted or forwarded by the satellite; it is determined that whether the terminal is able to perform a satellite search successfully according to the quality of a downlink signal; without depending on ephemeris information, and the terminal can be accurately and fast search for the satellite for successful access and communication, which is convenient for users to set the usage status of the terminal and prolong the service cycle of the terminal.

Further, on the basis of the foregoing method embodiments, in case that the base station signal is an SSB signal, the processor is configured to implement the following steps:

in case that a signal measurement value of a primary synchronization signal (PSS) or secondary synchronization signal (SSS) in the SSB signal is greater than a first measurement preset value, determining that the quality of the downlink signal of the base station is up to a quality standard; or in case that a correct ID of a cell is detected according to the SSB signal, determining that the quality of the downlink signal of the base station is up to a quality standard.

The signal measurement value includes a reference signal receiving power (RSRP) of the synchronization signal or a reference signal receiving quality (RSRQ) of the synchronization signal.

Further, on the basis of the foregoing method embodiments, in case that the base station signal is n common reference signal (CRS), the processor is configured to implement the following steps:

determining the quality of the downlink signal of the base station to be up to a quality standard in case that the signal measurement value of the CRS signal is greater than a second measurement preset value, or a SNR of a receiving end for the CRS signal is greater than a third measurement preset value;

and the signal measurement value includes a RSRP of the synchronization signal or a RSRQ of the synchronization signal.

In an embodiment, on the basis of the above embodiments, the processor is configured to implement the following steps:

in case that the quality of the downlink signal of the base station is up to the quality standard, determining that the terminal successfully searches for satellites, and recording a beam sweeping interval, a sweeping frequency and a satellite searching time; and calculating ephemeris information according to the beam sweeping interval, the sweeping frequency and the satellite searching time, and performing the network access process by the terminal according to the ephemeris information.

In an embodiment, on the basis of the above embodiments, the processor is configured to implement the following steps:

in case that the quality of the downlink signal of the base station is not up to the quality standard, replacing with a new beam sweeping interval and sweeping frequency, and receiving the base station signal transmitted or forwarded by the satellite at a sweeping frequency in the new beam sweeping interval.

In an embodiment, on the basis of the above embodiments, the processor is configured to implement the following steps:

determining a sweeping angle range of the beam sweeping interval according to a movement direction of the satellite, and searching for satellite signals at one or more sweeping frequency of each beam sweeping interval within the sweeping angle range; or, determining the target sweeping interval according to a preset sweeping angle, and searching for satellite signals at respective sweeping frequencies of the target sweeping interval, without performing angle sweeping;

The respective sweeping frequencies are sorted according to the frequency multiplexing mode of the satellite, and the periodic polling is performed.

The terminal described in the present embodiment can be used to execute the corresponding method embodiments above, and the principles thereof are similar, and details are not described herein again.

An embodiment discloses a computer program product, which includes a computer program stored on a non-transitory computer readable storage medium, the computer program includes program instructions, in case that executed by a computer, causes the computer to perform the following method:

determining a beam sweeping interval and a sweeping frequency, and receiving a base station signal transmitted or forwarded by a satellite;

determining a quality of a downlink signal of the base station according to the base station signal;

performing the network access process in case that it is determined that the terminal is able to perform a satellite search successfully according to the quality of the downlink signal of the base station;

the terminal set at least one beam sweeping interval within the range covered by a communication sweeping angle, and at least one sweeping frequency is set for each beam sweeping interval.

An embodiment provides a non-transitory computer readable storage medium having stored thereon computer instructions, the computer instructions cause a computer to perform the following method:

determining a beam sweeping interval and a sweeping frequency, and receiving a base station signal transmitted or forwarded by a satellite;

determining a quality of a downlink signal of the base station according to the base station signal;

performing the network access process in case that it is determined that the terminal is able to perform a satellite search successfully according to the quality of the downlink signal of the base station;

the terminal set at least one beam sweeping interval within the range covered by a communication sweeping angle, and at least one sweeping frequency is set for each beam sweeping interval.

The device embodiments described above are merely illustrative, and the units described as separate components may or may not be physically separate, and the components displayed as units may or may not be physical units, that is, may be located at the same place, or it can be distributed to multiple network units. Some or all of the modules may be selected according to actual needs to achieve the purpose of the solution of the present embodiment.

The various embodiments can be implemented by means of software and a necessary general hardware platform, and of course, by hardware. Therefore, the embodiments of the present application provide a software product, which is stored in a storage medium such as ROM or RAM, magnetic Discs, optical discs, etc., including several instructions to cause a computer device (for example, a personal computer, server, or network device, etc.) to perform various embodiments or a part of the methods described in various embodiments.

Finally, it should be noted that the above embodiments are only used to explain the present application, and are not limited thereto; although the present application has been described in detail with reference to the foregoing embodiments.

What is claimed is:

1. A method for accessing a network, performed by a terminal, comprising:

determining, by the terminal, a beam sweeping interval and a sweeping frequency, and receiving a base station signal transmitted or forwarded by a satellite;

determining quality of a downlink signal of a base station according to the base station signal;

determining that the terminal is able to perform the satellite search successfully in case that the quality of the downlink signal of the base station is up to the quality standard, recording the beam sweeping interval, and the sweeping frequency and a satellite searching time; and calculating ephemeris information according to the beam sweeping interval, the sweeping frequency and the satellite searching time, and performing the network access process of the terminal according to the ephemeris information, wherein the determining, by the terminal, a beam sweeping interval and a sweeping frequency comprises setting at least one beam sweeping interval within a range covered by a sweeping angle, and setting at least one sweeping frequency for each beam sweeping interval.

2. The method of claim 1, wherein in case that the base station signal is a synchronization signal block (SSB) signal, the determining the quality of the downlink signal of the base station according to the base station signal comprises:

determining that the quality of the downlink signal of the base station is up to a quality standard in case that a signal measurement value of a primary synchronization signal (PSS) or a secondary synchronization signal (SSS) in the SSB signal is greater than a first measurement preset value; or determining that the quality of the downlink signal of the base station is up to a quality standard in case that a correct ID of a cell is detected according to the SSB signal;

wherein the signal measurement value includes a reference signal receiving power (RSRP) of the synchronization signal or a reference signal receiving quality (RSRQ) of the synchronization signal.

3. The method of claim 2, further comprising:

replacing with a new beam sweeping interval and a new sweeping frequency in case that the quality of the downlink signal of the base station is not up to the quality standard, and receiving a base station signal transmitted or forwarded by the satellite at the new sweeping frequency in the new beam sweeping interval.

4. The method of claim 2, wherein the determining, by the terminal, the beam sweeping interval and the sweeping frequency, and receiving the base station signal transmitted or forwarded by the satellite comprises:

determining a range of the sweeping angle of the beam sweeping interval according to a movement direction of the satellite, and searching for a satellite signal at one or more sweeping frequency of each beam sweeping interval within the sweeping angle range; or determining a target sweeping interval according to a preset sweeping angle, and searching for a satellite signal at respective sweeping frequencies of the target sweeping interval without performing an angle sweeping, wherein the respective sweeping frequencies are sorted according to a frequency multiplexing mode of the satellite, and a periodic polling is performed.

5. The method of claim 1, wherein in case that the base station signal is a common reference signal (CRS), the determining the quality of the downlink signal of the base station according to the base station signal comprises:

determining that the quality of the downlink signal of the base station is up to a quality standard in case that a signal measurement value of the CRS signal is greater than a second measurement preset value, or a signal to noise ratio (SNR) of a receiving end for the CRS signal is greater than a third measurement preset value, wherein the signal measurement value comprises a Reference Signal Received Power (RSRP) of the SSB signal or a Reference Signal Received Quality (RSRQ) of the SSB signal.

6. The method of claim 5, wherein the performing, by the terminal, the network access process in case that it is determined that the terminal is able to perform the satellite search successfully according to the quality of the downlink signal of the base station comprises:

determining that the terminal is able to perform the satellite search successfully in case that the quality of the downlink signal of the base station is up to the quality standard, recording the beam sweeping interval, and the sweeping frequency and a satellite searching time; and calculating ephemeris information according to the beam sweeping interval, the sweeping frequency and the satellite searching time, and performing the network access process of the terminal according to the ephemeris information.

7. The method of claim 5, further comprising:

replacing with a new beam sweeping interval and a new sweeping frequency in case that the quality of the downlink signal of the base station is not up to the quality standard, and receiving a base station signal transmitted or forwarded by the satellite at the new sweeping frequency in the new beam sweeping interval.

8. The method of claim 5, wherein the determining, by the terminal, the beam sweeping interval and the sweeping frequency, and receiving the base station signal transmitted or forwarded by the satellite comprises:

determining a range of the sweeping angle of the beam sweeping interval according to a movement direction of the satellite, and searching for a satellite signal at one or more sweeping frequency of each beam sweeping interval within the sweeping angle range; or determining a target sweeping interval according to a preset sweeping angle, and searching for a satellite signal at respective sweeping frequencies of the target sweeping interval without performing an angle sweeping, wherein the respective sweeping frequencies are sorted according to a frequency multiplexing mode of the satellite, and a periodic polling is performed.

9. The method of claim 1, wherein the determining, by the terminal, the beam sweeping interval and the sweeping frequency, and receiving the base station signal transmitted or forwarded by the satellite comprises:

determining a range of the sweeping angle of the beam sweeping interval according to a movement direction of the satellite, and searching for a satellite signal at one or more sweeping frequency of each beam sweeping interval within the sweeping angle range; or determining a target sweeping interval according to a preset sweeping angle, and searching for a satellite signal at respective sweeping frequencies of the target sweeping interval without performing an angle sweeping, wherein the respective sweeping frequencies are sorted according to a frequency multiplexing mode of the satellite, and a periodic polling is performed.

10. A terminal, comprising:

a processor; and a memory storing programs that are executable by the processor;

wherein the programs are executed by the processor to implement the following steps:

determining a beam sweeping interval and a sweeping frequency, and receiving a base station signal transmitted or forwarded by a satellite;

determining quality of a downlink signal of a base station according to the base station signal;

determining that the terminal is able to perform the satellite search successfully in case that the quality of the downlink signal of the base station is up to the quality standard, recording the beam sweeping interval, and the sweeping frequency and a satellite searching time; and calculating ephemeris information according to the beam sweeping interval, the sweeping frequency and the satellite searching time, and performing the network access process of the terminal according to the ephemeris information, wherein the terminal is configured to set at least one beam sweeping interval within a range covered by a sweeping angle, and at least one sweeping frequency is set for each beam sweeping interval.

11. The terminal of claim 10, wherein in case that the base station signal is a synchronization signal block (SSB) signal, the programs are executed by the processor to further implement the following steps:

determining that the quality of the downlink signal of the base station is up to a quality standard in case that a signal measurement value of a primary synchronization signal (PSS) or a secondary synchronization signal (SSS) in the SSB signal is greater than a first measurement preset value; or determining that the quality of the downlink signal of the base station is up to a quality standard in case that a correct ID of a cell is detected according to the SSB signal;

wherein the signal measurement value includes a reference signal receiving power (RSRP) of the synchronization signal or a reference signal receiving quality (RSRQ) of the synchronization signal.

12. The terminal of claim 11, wherein the programs are executed by the processor to further implement the following steps:

replacing with a new beam sweeping interval and a new sweeping frequency in case that the quality of the downlink signal of the base station is not up to the quality standard, and receiving a base station signal transmitted or forwarded by the satellite at the new sweeping frequency in the new beam sweeping interval.

13. The terminal of claim 11, wherein the programs are executed by the processor to further implement the following steps:

determining a range of the sweeping angle of the beam sweeping interval according to a movement direction of the satellite, and searching for a satellite signal at one or more sweeping frequency of each beam sweeping interval within the sweeping angle range; or determining a target sweeping interval according to a preset sweeping angle, and searching for a satellite signal at respective sweeping frequencies of the target sweeping interval without performing an angle sweeping;

wherein respective sweeping frequencies are sorted according to a frequency multiplexing mode of the satellite, and a periodic polling is performed.

14. The terminal of claim 10, wherein in case that the base station signal is a common reference signal (CRS), the programs are executed by the processor to further implement the following steps:

determining that the quality of the downlink signal of the base station is up to a quality standard in case that a signal measurement value of the CRS signal is greater than a second measurement preset value, or a signal to noise ratio (SNR) of a receiving end for the CRS signal is greater than a third measurement preset value, wherein the signal measurement value comprises a RSRP of the SSB signal or a RSRQ of the SSB signal.

15. The terminal of claim 14, wherein the programs are executed by the processor to further implement the following steps:
   determining that the terminal is able to perform the satellite search successfully in case that the quality of the downlink signal of the base station is up to the quality standard, recording the beam sweeping interval, and the sweeping frequency and a satellite searching time; and
   calculating ephemeris information according to the beam sweeping interval, the sweeping frequency and the satellite searching time, and performing the network access process of the terminal according to the ephemeris information.

16. The terminal of claim 14, wherein the programs are executed by a processor to further implement the following steps:
   replacing with a new beam sweeping interval and a new sweeping frequency in case that the quality of the downlink signal of the base station is not up to the quality standard, and receiving a base station signal transmitted or forwarded by the satellite at the new sweeping frequency in the new beam sweeping interval.

17. The terminal of claim 14, wherein the programs are executed by the processor to further implement the following steps:
   determining a range of the sweeping angle of the beam sweeping interval according to a movement direction of the satellite, and searching for a satellite signal at one or more sweeping frequency of each beam sweeping interval within the sweeping angle range; or
   determining a target sweeping interval according to a preset sweeping angle, and searching for a satellite signal at respective sweeping frequencies of the target sweeping interval without performing an angle sweeping;
   wherein respective sweeping frequencies are sorted according to a frequency multiplexing mode of the satellite, and a periodic polling is performed.

18. The terminal of claim 10, wherein the programs are executed by the processor to further implement the following steps:
   determining a range of the sweeping angle of the beam sweeping interval according to a movement direction of the satellite, and searching for a satellite signal at one or more sweeping frequency of each beam sweeping interval within the sweeping angle range; or
   determining a target sweeping interval according to a preset sweeping angle, and searching for a satellite signal at respective sweeping frequencies of the target sweeping interval without performing an angle sweeping;
   wherein respective sweeping frequencies are sorted according to a frequency multiplexing mode of the satellite, and a periodic polling is performed.

* * * * *